United States Patent [19]

Nor

[11] Patent Number: 5,202,617
[45] Date of Patent: Apr. 13, 1993

[54] CHARGING STATION FOR ELECTRIC VEHICLES

[75] Inventor: Jiri K. Nor, Oakville, Canada

[73] Assignee: Norvik Technologies Inc., Mississauga, Canada

[21] Appl. No.: 775,319

[22] Filed: Oct. 15, 1991

[51] Int. Cl.⁵ ............................................... H02J 7/00
[52] U.S. Cl. .......................................... 320/2; 320/18; 320/21; 320/31; 324/434
[58] Field of Search .................... 320/2, 31, 17, 18, 21; 324/434

[56] References Cited

U.S. PATENT DOCUMENTS

| | | | |
|---|---|---|---|
| 3,593,100 | 7/1971 | Foster | 320/31 X |
| 3,904,947 | 9/1975 | Crews | 320/2 |
| 4,496,896 | 1/1985 | Melocik et al. | 320/2 |
| 4,746,852 | 5/1988 | Martin | 320/31 X |
| 4,977,364 | 12/1990 | Kordesch et al. | 320/39 X |

Primary Examiner—R. J. Hickey
Attorney, Agent, or Firm—Donald E. Hewson

[57] ABSTRACT

A charging station for electric vehicles which have rechargeable batteries is provided. The charging station comprises a power section controlled by a fast acting power controller, a power connector and associated power cables for connecting to the vehicle, an interface with signal cables to carry status and/or control signals between the vehicle and the power controller, and a lockout which precludes delivery of power to the vehicle except when the power connector is in place. High charging currents are delivered to the battery of the vehicle as a consequence of signals at any instant in time to the power controller, so as to be able to turn delivery of the charging current on and off in less than a few milliseconds. The resistance free voltage of the vehicle battery is measured during intervals when the charging current is off, and the operation of the power controller is a function of the battery resistance free voltage at any instant in time. Operation may be manually controlled, whereby at least maximum voltage and current settings are preset by the operator; or operation may be completely automatic and under the control of a charge controller within the vehicle and associated with the battery. Thus, for each vehicle that is equipped with a charge controller, the operation of the charging station is battery specific, and may be quite different as to conditions of voltage and current being delivered to another electric vehicle which may be subsequently recharged from the same charging station.

22 Claims, 4 Drawing Sheets

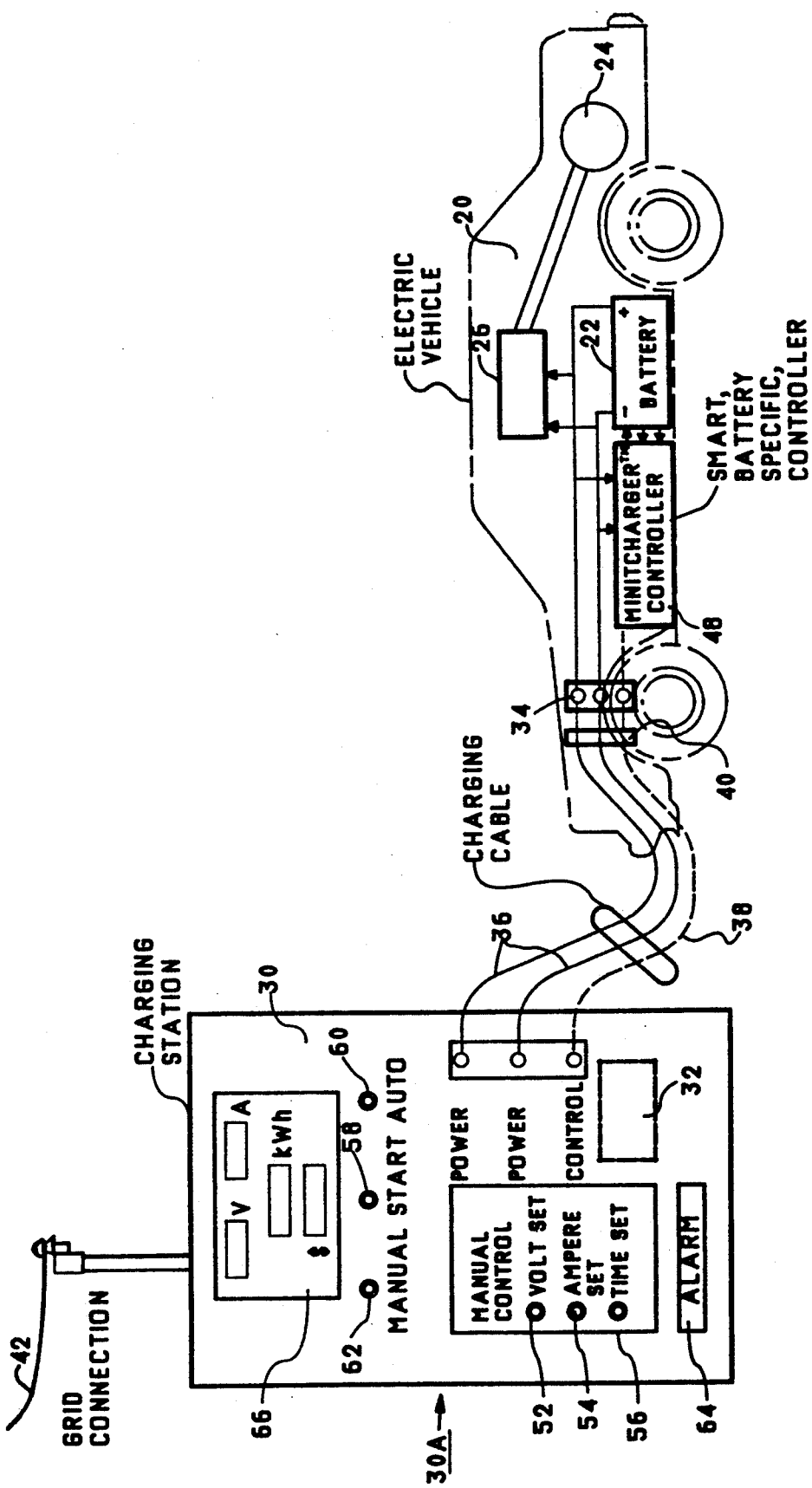

CHARGING STATION FOR ELECTRIC VEHICLES

FIELD OF THE INVENTION

This invention relates to charging stations for electric vehicles. In particular, this invention provides high power chargers at which electric vehicles may have their on-board batteries recharged quickly, efficiently, and safely.

BACKGROUND OF THE INVENTION

While, in general, the present invention is specifically directed to electric vehicles of the sort that are, essentially, passenger vehicles or cargo vehicles such as vans and light trucks, it will be kept in mind that the present invention is equally adapted for use with such other electric vehicles as electric golf carts, fork lift trucks and other industrial trucks and pallet lifters, and the like. However, as discussed in greater detail hereafter, the present invention particularly lends itself to commercial applications wherein electric vehicles such as passenger vehicles and on-road cargo vehicles may recharge their batteries in much the same manner as present day vehicles having internal combustion engines re-fill their fuel tanks. Thus, a charging station for electric vehicles in keeping with the present invention may be found at street corners, along highways, and so on.

There are presently a number of experimental electric vehicles of the passenger type. Almost universally, however, those vehicles are extremely inefficient, carry very heavy batteries, and at best have very limited range of perhaps 100 or 200 km before the batteries need to be recharged. Significant research is being carried on throughout the world to develop new batteries which have much higher power per unit weight, and higher capacity, so as to allow faster and more long-ranging vehicles to be developed; and the present invention recognizes that as such vehicles reach the road either experimentally or particularly as commercial vehicles, there will be a much greater requirement for facilities to recharge them. Of course, such charging stations must be capable of delivering charging power to the batteries safely, quickly, and economically.

It follows that such charging stations must be capable of being controlled in such a manner that different batteries, having different capacities and even different terminal voltages—or, for that matter, being of different types—must be accommodated at the charging station for delivery of charging power. That means that there must be sufficient control either within the charging station or associated with the batteries to be charged, to permit such charging conditions; and as well, the charging station must be equipped in such a manner as to be compatible with the electric vehicles. Obviously, for commercial installations, means must also be provided to measure the amount of power being delivered and to arrive at a monetary charge to be paid by the consumer. The specifics of that issue are beyond the scope of the present invention.

Presently, electric vehicles are often equipped with an on-board charger associated with the battery, whereby slow charging—for example, overnight—of the battery may be accomplished from an ordinary electrical outlet. It may also be that the garage in which the vehicle is stored may be equipped with a stationary charger which may otherwise be the same as an on-board charger, but whereby more than one vehicle may be charged—however, usually only one at a time. These two methods are the ones which are most often found in electric over-the-road vehicles, while the second alternative noted above is most usually found in industrial charging installations for fork lift trucks and the like. Other electric vehicles such as golf carts may have removable battery trays which are taken from the vehicle and charged while a duplicate battery tray is placed in the vehicle to continue its useful working employment. Clearly, for electric passenger vehicles, and the like, the mass and weight of batteries required to power the vehicle—as well as the cost of the batteries—preclude any consideration of removable battery trays.

At present, most electric vehicles—particularly commercial and industrial vehicles such as fork lift trucks, golf carts, and the like—employ lead acid batteries. Other prospective and experimental vehicles, at least in the near future, may employ nickel cadmium, nickel iron, or nickel metal hydride batteries, with other batteries such as liquid sodium being further over the horizon.

The present invention, however, will accommodate all of those circumstances of battery charging for all kinds of electric vehicles, such as those discussed above.

Reference is made to co-pending U.S. patent applications Ser. No. 07/253,703 filed Oct. 6, 1988 and Ser. No. 07/676,523 filed May 2, 1991, for in depth discussions of fast battery charging and discussion of the battery chargers having advanced features whereby very rapid and safe battery charging is assured. Both of those co-pending applications are assigned to a common assignee herewith, with a common inventor as herein. The chargers of those inventions are capable of recharging quality traction or SLI batteries in 10 to 20 minutes. However, the energy requirement of an electrical automobile, in particular, may be in the range of from 20 to 50 kWh, and to deliver that energy in a short time requires that the charger have a high power rating, for example in the range of 100 to 300 kW. Obviously, chargers having power ratings of 300 kW have to be strategically located and properly connected into the electrical distribution grid. Such chargers may be found in charging stations in keeping with the present invention in typical locations such as ordinary service stations, fleet depots, and perhaps even in such locations as parking lots and the like.

However, as noted above, electric vehicles including electric automobiles and delivery vans and the like, are far from standardized as to the battery capacities and voltages that are built into them, and will probably continue in that same mode. For example, an experimental vehicle identified as IMPACT TM produced by General Motors has a 320 volt battery with a capacity of 45 Ah; whereas the PANDA ELETTRA TM produced by Fiat carries a 72 volt battery, but has a capacity of 185 Ah.

What the present invention provides is a universal charging station at which a wide variety of electric vehicles may be charged, over a wide range of parameters. Of course, a number of preconditions apply, including the requirement that the vehicle to be charged must be equipped with a compatible power connector, and the obvious requirement that the charging station must be capable of providing a DC voltage at a sufficient level for any given vehicle, and at high current rates. Because of the nature of the charging station, signals will pass from the battery being charged to a power controller in the power section of the charging station, so at least a minimal accommodation for signals which are at least indicative of the voltage of the battery at any instant in time must be made. Of course, if the entire installation including the power delivery section of the charging station and the control means which controls the power section (and which may be specific as to the battery to be charged) are in keeping with the teachings of the co-pending applications noted above, then assured delivery of the maximum power in the shortest possible time to the battery will be achieved. Otherwise, the charging station of the present invention will still operate, but there will be no certainty as to optimum performance.

To that end, the present invention provides a charging station for electric vehicles that are equipped with a rechargeable battery, a traction motor and a traction controller for said traction motor, where the charging station comprises the following principle components:

A power section; a power controller section; a power connector for connecting the power section to an electric vehicle for recharging the battery thereof; an interface between said charging station and said electric vehicle; power cables capable of carrying high charging currents from the power section through the power connector to the electric vehicle; signal cable means capable of carrying control signals between the power controller section and the electric vehicle; and lockout means.

The power section is capable of delivering high charging currents at the requisite charging voltage for the battery being charged within predetermined limits of power to be delivered. The rate of delivery of the charging current is controllable.

The power section comprises a power source, a rectifier, and a switching inverter module; and each of the power controller section and the inverter module are fast acting so as to be able to turn delivery of the charging current on and off in less than a few milliseconds. More generally, the power section comprises a power source rectifying means, and means for controlling the flow of charging current to the rechargeable battery.

The signal cable carries signals from the battery to the power controller that are at least indicative of the voltage of the battery at any instant in time. At least the power cables and the signal cable means are associated with the interface.

Means are provided for measuring the resistance free voltage of the battery during intervals when delivery of said charging current to said battery has been turned off. Thus, operation of the power controller section may be affected by the resistance free voltage; and thereby operation of the switching inverter module or other means for controlling the flow of charging current to the battery, and of the charging station, may be controlled as a function of the resistance free voltage of said battery.

The lockout means of the charging station is adapted to preclude delivery of charging current to the battery except when the lockout means is locked closed. The lockout means is conveniently associated with said power connector.

Thus, operation of the charging station to recharge a battery in an electric vehicle is contingent upon the lockout means being locked closed so as to assure flow of charging current and control signals on their respective cables, and the charging operation is controlled so that the power being delivered is within the predetermined limits. Of further significance is the safety aspect of the lockout means, whereby the physical and electrical design of the power connector may be such as to assure that the operator will not be able to contact—or be exposed to—high voltage terminals connected to the battery or to the charging station.

In a particular type of charging station in keeping with the present invention, which may be such that the charging station will provide optimum performance, the charging station will be adapted to communicate with an on-board charge controller located within the vehicle, and which is adapted to control the rate of delivery of charging current to the battery. In that case, the charge controller is specific as to the battery to be charged so that its operating functions are contingent upon the type of battery to be charged, its nominal voltage and its nominal electrochemical energy capacity. The charge controller is adapted to pass signals via the signal cable means to the power controller section. Thus, operation of the power controller section is contingent upon the nature of signals received by it from the charge controller, and thereby operation of the charging station is controlled and is battery specific.

In the usual circumstances, the interface and the power connector are physically associated with each other. Indeed, the interface and the power connector may be one and the same thing. Moreover, in the most simple installations where operation of the battery charging station is not battery specific, the signals relating to the resistance free voltage of the battery may be passed over the charging current cables, thereby obviating the neccessity for separate signal cables in such circumstances.

BRIEF DESCRIPTION OF THE DRAWINGS

This invention will be described hereafter in association with the accompanying figures of the drawings, in which:

FIG. 3 is a representation of a charging station of the present invention in a typical operating situation, with a charge controller on board the vehicle whose battery is being charged;

DESCRIPTION OF THE PREFERRED EMBODIMENTS

Figure 1:
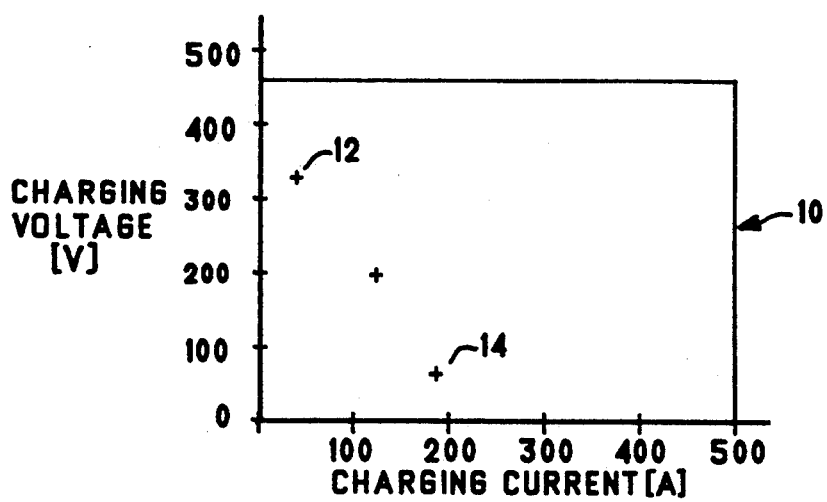
FIG. 1 is a charger characteristic envelope comparing charging voltage to charging current, with relatively high peak power capability.

Turning first to FIG. 1, a charging envelope is illustrated, showing the maximum charging voltages and charging current that may be expected to be provided by a charging station according to the present invention, for typical electric passenger vehicles. Because of the installed characteristics of the battery in those vehicles, the charging station must be capable of delivering charging power at voltages up to about 450 volts with charging currents up to about 500 amperes. Reference to the co-pending applications noted above, and a further co-pending application also in the name of the present inventor and with a common assignee—which latter application specifically directs itself to a monitoring system for large batteries while they are being charged and discharged—demonstrates the requirement for a charging station of the present invention to provide a substantial if not complete charge to the high capacity batteries found in electric vehicles in very short periods of time of, say, from 5 to 30 minutes.

The charger characteristic envelope 10 in FIG. 1 shows a charging voltage of up to 450 volts, with a charging current of up to 500A. Thus, if the charger having such a characteristic were required to deliver its peak voltage at its peak current, it would be required to be capable of delivering a peak output power of 225 kW.

The characteristics of a battery for a GM IMPACT automobile were noted above as being 320 volts, with a capacity of 45 Ah. Assuming that the charger might take one hour to deliver 45 Ah of energy to the battery, point 12 in FIG. 1 shows a charging characteristic for one hour charge to that battery at 45 A. Likewise, point 14 shows a one hour charge at 72 volts and 185 A to the PANDA ELETTRA battery.

However, if both of those batteries are capable of being charged with a charging current of 500 A, then the length of time to deliver the charge to the IMPACT battery would be 45/500 hours, or 0.09 hours—less than 6 minutes; and the PANDA ELETTRA battery could be charge in 185/500 or 0.37 hours—just over 22 minutes. Clearly, a charger having a characteristic envelope of FIG. 1 is quite capable of delivering such charge in those periods of time.

Figure 2:
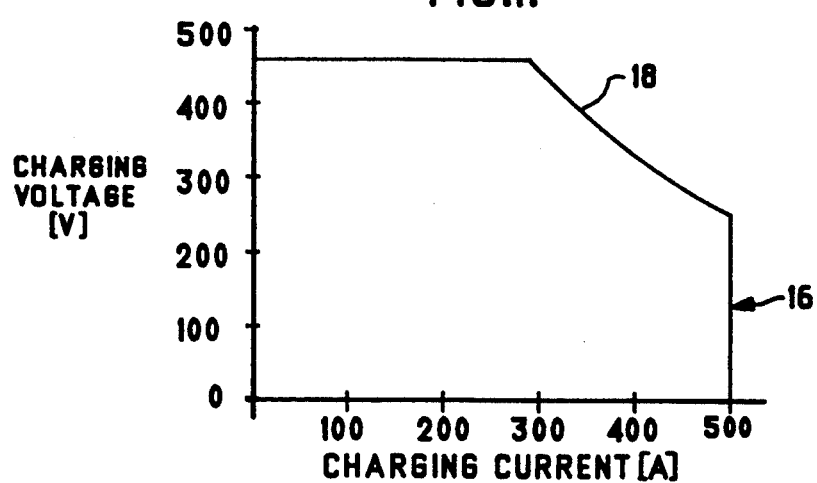
FIG. 2 is a modified charger characteristic envelope from FIG. 1.

Still further, if the charger maximum or peak power is limited to only 120 kW, or only about one-half of the possible peak power of a charger having the characteristic of FIG. 1, then its charger characteristic envelope would have the form of envelope 16 of FIG. 2. There, the curve 18 is a constant power line at 120 kW, showing the limits of the envelope at 400 V and 300 A, for example, or 300 V and 400 A; with the maximum current capability at 450 V being 267 A, and the maximum voltage that could be accommodated at 500 A being 240 V. It follows, therefore, that the IMPACT battery at 320 V could only be charged at 375 A while maintaining peak power of the charging station at 120 kW, or in other words in about 0.12 hours or slightly over 7 minutes. The PANDA ELETTRA battery would be unaffected as to its charging time.

The obvious advantage of employing a charger having a characteristic such as that shown in FIG. 2 is that by limiting its peak power capabilities the nature of its connection to the electric power distribution grid may be different, as might be the charges for electric energy consumed—which are very often based not only on kWh energy assumed but on peak power in kW. Moreover, it is illustrated that despite the quite broadly spread characteristics of battery voltages and capacities in vehicles of the same general type, their charging times can be relatively narrowly defined. In other words, a charging station having a charging characteristic envelope such as that shown in FIG. 2 will serve all purposes with lower capital costs and lower operating costs than one having a charging characteristic envelope of FIG. 1.

Figure 4:
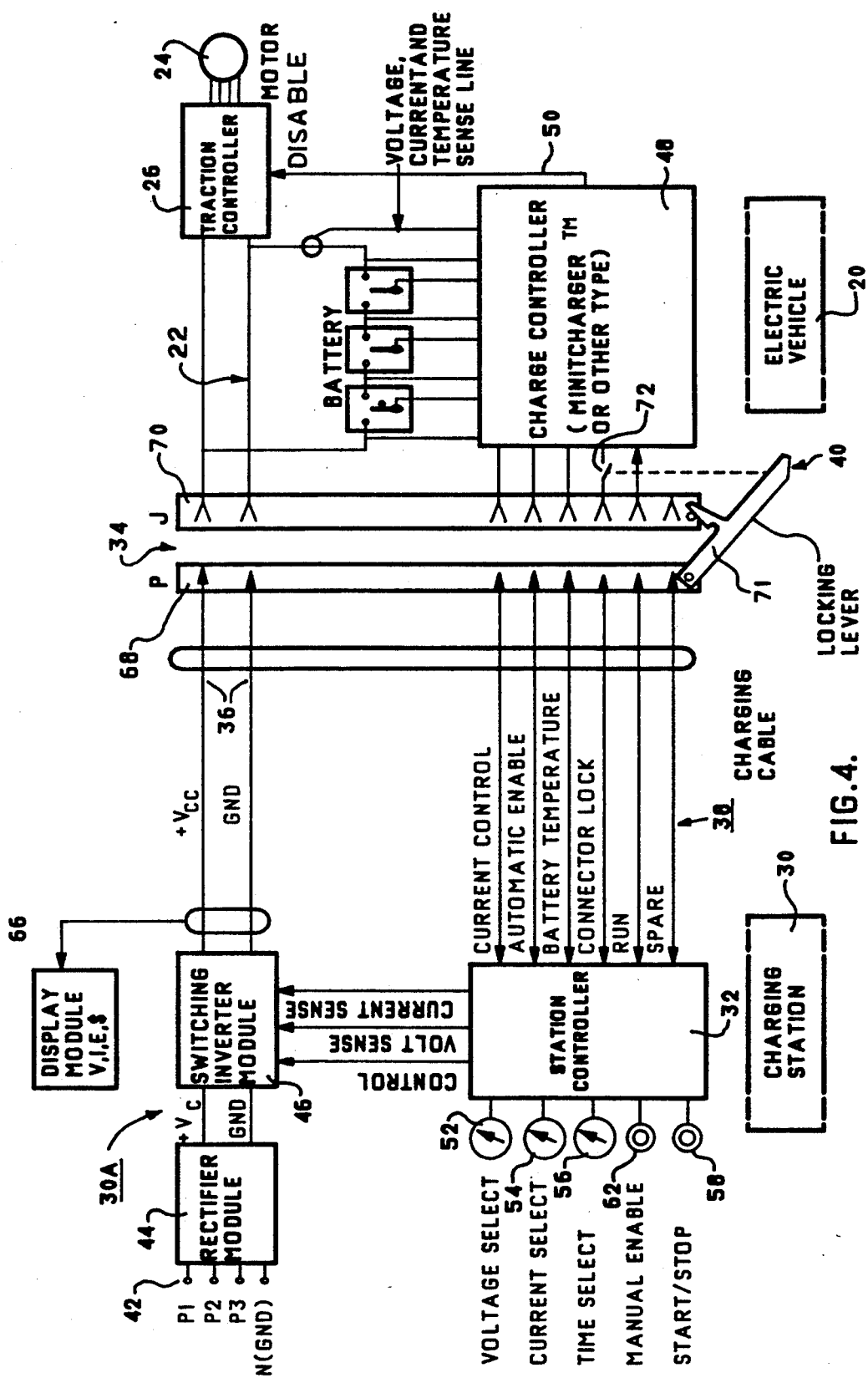
FIG. 4 is a block schematic of a typical charging situation similar to that of FIG. 3.

Turning now to a discussion of FIGS. 3 and 4, in its broadest sense the present invention provides a charging station for electric vehicles having the following components, limitation, and characteristics:

An electric vehicle 20 is equipped with a rechargeable battery 22, a traction motor 24, and a traction controller 26 which controls the traction motor. The charging station 30 has a power section generally defined at 30A, with a power controller section indicated generally at 32, and a power connector which is indicated generally at 34 and which is adapted to connect the power section 30A to the electric vehicle 20. There is an interface between the power station and the electric vehicle, which interface may physically comprise connectors, cables, the power connector 34, and so on.

Power cables 36 are capable of carrying high charging currents from the power section of the charging station through the power connector 34 to the electric vehicle 20. Signal cables, indicated generally at 38, are provided to carry control signals between the power controller section of the charging station and the electric vehicle. Lockout means as shown generally at 40 are provided, as discussed in greater detail hereafter.

Obviously, the power section 30A is capable of delivering the high charging currents that are necessary to charge the battery 22, at the requisite charging voltage. The charging voltage is generally just slightly higher than the nominal terminal voltage of the battery when it is in its operating condition. The power being delivered to the battery is within predetermined limits, for the reasons discussed above with reference to FIG. 2. The rate of delivery of the charging current is controllable through various means, including operation of the power controller section 32 of the charging station. Within the power section of the charging station there is a power source which is generally the local power distribution grid 42, a rectifier 44, and a switching inverter module 46. The signal cable 38 is adapted to carry signals from the battery 22 to the power controller section 32, and the signals are at least indicative of the voltage of the battery 22 at any instant in time. Other advanced features are discussed below. The rectifier 44 and switching inverter module 46 could also be a silicon controlled rectifier having phase control of its switching operation.

Each of the power controller section 32 and the inverter module 46 are fast acting so as to be able to turn delivery of the charging current through the power cables 36 on and off, in less than a few milliseconds. Typically, the charging current may have a turn off time of less than 1 millisecond, and a turn on time of less than 2 milliseconds.

So as to provide at least a modicum of control of the delivery of charging current over the power cables 36 to the battery 22, means 48 are provided to measure the resistance free voltage of the battery 22 during intervals when delivery of the charging current to the battery has been turned off. The module 48 will generally comprise much more than simply means for measuring resistance free voltage of the battery, in the manner described in the co-pending applications noted above, and as discussed in greater detail hereafter. In any event, it is clear that operation of the switching inverter module may be controlled at least as a function of the resistance free voltage of the battery. Indeed, signals which are indicative of the resistance free voltage of the battery could be passed to the power controller section 32 along the power cables 36.

The lockout means 40 is adapted to preclude delivery of charging current to the battery 22 except when the lockout means is locked closed. The lockout means is conveniently associated with the power connector 34. Thus, operation of the charging station 30 to recharge the battery 22 is contingent upon the lockout means 40 being locked closed, whereby flow of charging current on the charging cables 36 and control signals on the control cables 38, will occur. The operation is thereby controlled so that the power being delivered to the battery 22 is within the predetermined limits.

The lockout means 40, and/or the design of the power connector 34, are conveniently designed and arranged so as to provide complete safety of operation, and thereby to assure the safety of the operator. Thus, when the power connector 34 is disconnected, and the lockout means 40 is open, the physical and electrical design of the power connector 34 and lockout means 40 acts to preclude any possibility of physical contact with live, high voltage terminals or connector contacts. The terminals or connector contacts electrically associated with the battery 22—which may have a high terminal voltage even when it is substantially discharged or depleted of stored electrical energy—are physically placed so that they can not be touched. The connecting pins that carry the charging current to the battery are disabled by the electrical lockout. Thus, operator safety is assured at all times.

As noted above, more efficient operation of the charging station of the present invention will occur when the control of the charging operation is effected as a consequence of measurement of a number of parameters surrounding the capability of the battery 22 to accept charge. In that sense, therefore, the module 48 may be battery specific, and be established as a charge controller which is specifically adapted to control the rate of delivery of charging current to the battery 22. The charge controller, being battery specific, may therefore control the delivery of charging current as a consequence of information and data which are either preset into the charge controller or continually monitored by it, including the type of battery to be charged, its nominal voltage, and its nominal electrochemical energy capacity. Other parameters may be continuously monitored, including the internal resistance free voltage of the battery, and its temperature, and control signals which are contingent upon the instantaneous values of those parameters may be passed to the power controller 32. This more closely conforms the charging operation to that described in the co-pending applications noted above. Moreover, when the internal resistance free voltage and temperature of the battery are specific to individual cells or groups of cells of the battery 22, the circuits and procedures followed are such as those described in a co-pending application of even date herewith, as noted above.

Obviously, as noted by line 50 in FIG. 4, means are associated with the lockout means 40 to disable the traction controller 26, so that during a charging operation there is no unnecessary current drain from the battery 22 by the traction motor 24.

It will also be noted that the installed battery 22 may, in fact, comprise a number of modules each of which can be considered to be a battery in its own right. The charge controller module 48 may sense the voltage across each of the battery modules, and is shown also to sense the temperature of each of the battery modules, in the circuit as shown in FIG. 4.

It is recognized that battery chargers of the sophistication of those taught in the co-pending applications are such that the charge controllers possess quite intimate knowledge of the battery being charged. Indeed, at least some information concerning the battery to be charged is required by any battery charger; and as the rate of charge of the battery increases, there is more information required so as to prevent unwanted abuse of the battery while at the same time achieving optimal charge in the shortest time period. For those reasons, a battery specific charge controller is most desirable.

In any event, it is clear from the above that, as so far described, the charging station of the present invention will permit the batteries of electric vehicles to be charged, even if they do not have a charge controller such as that described in association with module 48. In that case, manually operable means are provided as shown in FIG. 3, whereby charging is essentially done under manual control by presetting the end voltage level at control 52 and the highest current level at which the charging current will be delivered at control 54. A timer may also be set at 56 whereby the charging operation will be terminated after a predetermined time period.

In the first step of operation of the charging station of the present invention, the power connector 34 is assembled. If the charge controller 48 is on board the vehicle, and it is compatible with the station power controller section 32, then lamp 60 is illuminated to give an indication that the subsequent steps will be taken automatically. Thus, an "AUTO" function is operative, and a "MANUAL" function is disabled. Operation is then started by toggling a start/stop control 58. Alternately, if the charge controller 48 is not present on board the vehicle, or is not compatible with the station power controller section 32, a switch 62—which permits manual setting of the controls 52, 54, and 56—may be operated. In such circumstances, the charging station 30 will operate at least within the predetermined limits of voltage, current, and peak power established for the charging station, once the end voltage level and highest current level have been preset. Such operation is essentially a constant current, constant voltage type of charging which is quite common at the present time for charging lead acid batteries, and is acceptable for charging lead acid batteries. However, optimal charging conditions will not be satisfied.

Moreover, it is assumed that when the manual controls 52 and 54 are set, the operator is aware of what values those controls must be set to, in order to avoid abuse to the battery, or alternatively to avoid an ineffective charging operation.

In any event, the module 48 may at least comprise a further means to determine the temperature of the battery 22, and to issue an alarm signal when the temperature of the battery 22 is above a predetermined level. The alarm signal would, for example, initiate operation of an alarm 64 so that a flashing light, a buzzer, or other alarm indication is given.

Obviously, a display module 66 is required with the charging station, in much the same manner as the indicators at a service station, and it may show the preset voltage and current levels at which the charging station will operate, either under manual control or as determined by the charge controller module 48. As well, the display module 66 would show an accumulated total of energy delivered in kWh, and the cost of the charging operation to be paid by the consumer in units of the local currency.

Some further discussion of specific features of FIG. 4 now follows:

The signal cable 38 may comprise a number of individual lines, on which there may be signals that are specific to current control, an enabling signal, the instantaneous value of the battery temperature, a confirmation signal that the lockout means is locked, a protocol or run signal may be required, and there may be spare lines.

The power connector 34 is conveniently one which accommodates the power cables 36 and the signal cables 38. Moreover, for convenience and safety, that portion of all of the power and signal cables that are hard wire connected to the charging station may terminate at a plug 68, which is adapted to physically mate with a receptacle or jack 70. Thus, the power connector conveniently has a first plug component 68 and a second jack component 70 which are adapted to mate physically and electrically with each other. The lockout means 40 may include means such as a lever 71 associated with a switch 72 on the connector lock line at the vehicle side of the receptacle 70, so that the entire charging operation is contingent upon the switch 72 having been closed. Thus, assurance is made that the power connector 34 is securely locked in place so as to handle the very high charging currents, and further so as to assure that the signal lines will be functional.

The following is a discussion of the sequence of events which occur when a vehicle battery charging operation takes place. That charging operation may either be under the control of a charge controller which is battery specific and is generally located on board the electric vehicle, such as charge controller module 48, or it may be a manual operation. In either event, the power connector 34 is assembled by mechanically joining the plug 68 to the receptacle or jack 70, thereby connecting the charging station to the vehicle. The lockout means such as the locking lever 71 is locked, thereby closing switch 72, so that the power controller 32 and the charge control module 48, if present, are both enabled. Charging will then begin.

In the absence of an on board charge controller module 48, or in the event that the charge controller module 48 is incompatible and does not send an automatic enable signal along the appropriate line in signal cable 38 to the power controller 32, a manual mode of operation may then be followed by the user. In that event, the manual enable switch 62 is engaged, at which time the voltage select operating switch 52, the current select switch 54, and the time select switch 56 would be set to zero for manual operation by the user. The appropriate settings selected by the user would be reflected on the display module 66, and as noted above it is assumed that the user will have read the owner's manual or have other knowledge so as to select the appropriate values. Upon completion of the selection, the start/stop button or switch 48 is operated, and charging will proceed within the limits of the constant current, constant voltage mode that has been established and within the predetermined limits of the charging station. A time limit would usually be required to be preset.

Charging would then proceed, with at least some control over the flow of charging current if not otherwise then at least by determination of the resistance free voltage of the battery as it may be detected during interruptions of the charging current. The charging operation would stop upon expiration of a predetermined time period, or upon the battery becoming too hot as discussed above with actuation of the alarm 64, or by manipulation of the start/stop switch 58. Of course, if the lockout 40 is disengaged, charging would immediately stop.

In the more usual circumstance, where the charge controller module 48 is specific to the battery 22, and is on board the vehicle, an automatic enable signal is sent by the charge controller module 48 to the power controller 32 over the appropriate signal line to the AUTO indicator lamp 60. The manual controls, with the exception of the start/stop switch 58, are disabled. At the same time, as noted above, the charge controller 48 would disable the traction controller 26 to prevent power drain from the battery 22 during charge.

When the start/stop button 58 is pressed, the power controller 32 sends a run or protocol signal to the charge controller 48, which responds by sending an appropriate current control signal on the designated line back to the power controller 32. The nature of the signals on the current control line, and the wave form of the charging current on the power cables 36, are discussed below with reference to FIGS. 5 and 6. Moreover, the charging operation will then be substantially as described in the co-pending applications noted above.

Once again, the charging operation is terminated either by automatic operation of the charge controller 48, when the battery 22 has been substantially fully charged, or by operation of the start/stop button 58, or by unlocking the lockout 40.

In all events, the temperature of the battery 22 would generally be monitored, with an appropriate operation and signal at the alarm 64 if the temperature of the battery is beyond a predetermined limit.

It is recognized that the high currents in the power cables 36 may induce differentials in the local ground potential along the length of the power cable. In the case of a modulated current, particularly under the control of the charge controller module 48, these differentials in local ground potential will also have an AC component. Therefore, care must be taken that these and other effects do not interfere with the control signals on the signal cable bundle 38.

All of the signals may be digital, including even the current control signal which might have the characteristic of a frequency or duty ratio which has been predetermined. In any event, it is appropriate that the signals on the various signal lines in the signal cable 38 are considered as being digital signals. The exact nature of the digital transmission with an appropriate signal to noise ratio is not material to the present invention; excellent techniques exist such as differential line receivers, current loops, or optocoupled inputs. The conductors themselves may be coaxial cables, but twisted pairs are considered to be the most cost effective signal cable choice, and are appropriate in the circumstances.

Figure 5:
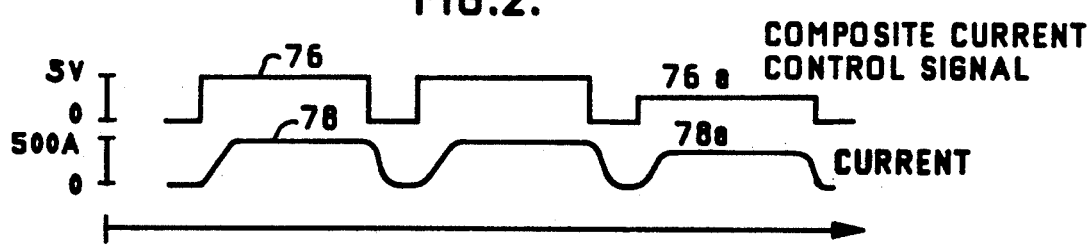
FIG. 5 shows a pair of traces of a typical compound control signal and the resulting current wave form.

FIG. 5 shows a composite current control signal on wave form 76, and the resultant charging current wave form on curve 78. Here, the composite current control signal is encoded into a voltage signal at a ratio of 10 mV/A—so that 5 V corresponds to a charging current of 500 A. It will be noted that the signal is a pulsed signal which is clock driven, where the pulses are equivalent to the duty cycle of the charging current. The first two cycles of the composite control signal 76, as shown, are each at a level equivalent to a charging current of 500 A, as noted on curve 78; whereas the third cycle at 76a is at 2.5 V which controls a charging current as shown at 78a of 250 A. It will be noted that when the control signal 76 is above a predetermined level (in this case, 0), then the charging current is on; and when the current control signal 76 is at or below that predetermined level, the charging current is off. Moreover, when the charging current is on, its level—as noted in FIG. 5—is a function of the level of the current control signal. It will be noted that the charging current turns off more rapidly that it turns on; in the usual circumstance, the charging current turns off in less than 1 ms, and turns on in less than 2 ms.

Figure 6:
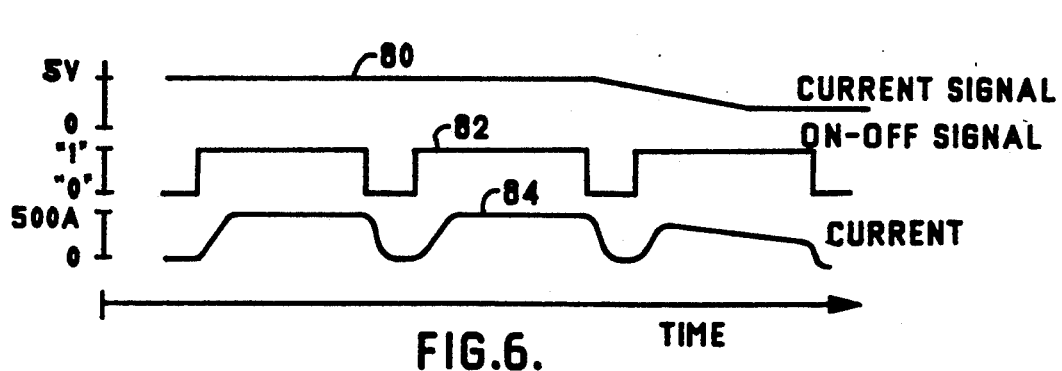
FIG. 6 is similar to FIG. 5 with a two component control signal.

FIG. 6 shows a similar situation to FIG. 5, except that the current control signal in this case comprises two signals 80 and 82. Signal 82 is strictly a two-level digital signal, having, for example, the usual "0" and "1" levels, and the current signal 80 is an analog signal which is also at the 10 mV/A level. Thus, the value of the analog current signal 80 reduces from 5 V to 2.5 V in the curve 80, and the current wave form 84 is the equivalent of the current wave form 78 in FIG. 5.

Obviously, in the event that the current control signal is digitally encoded, the composite signal wave form 76 will require a wider band width than if the two components 80 and 82 are sent over a twisted pair transmission mode with differential receivers. That example is simply one of many modes by which the control signals which control and are indicative of the charging current, as well as other control signals in respect of voltage level, battery temperature, and so on, are transmitted between the charge controller module 48 and the power controller 32.

Figure 7:
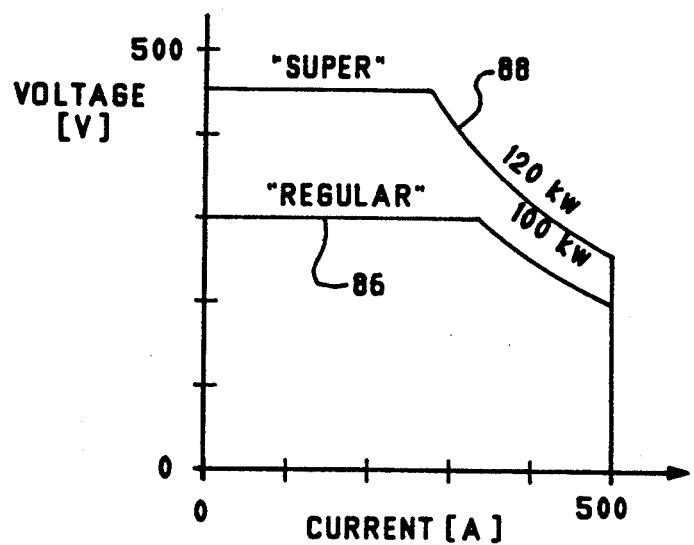
FIG. 7 is similar to FIG. 2, showing two different charger characteristic envelopes with differing peak voltages.
Figure 8:
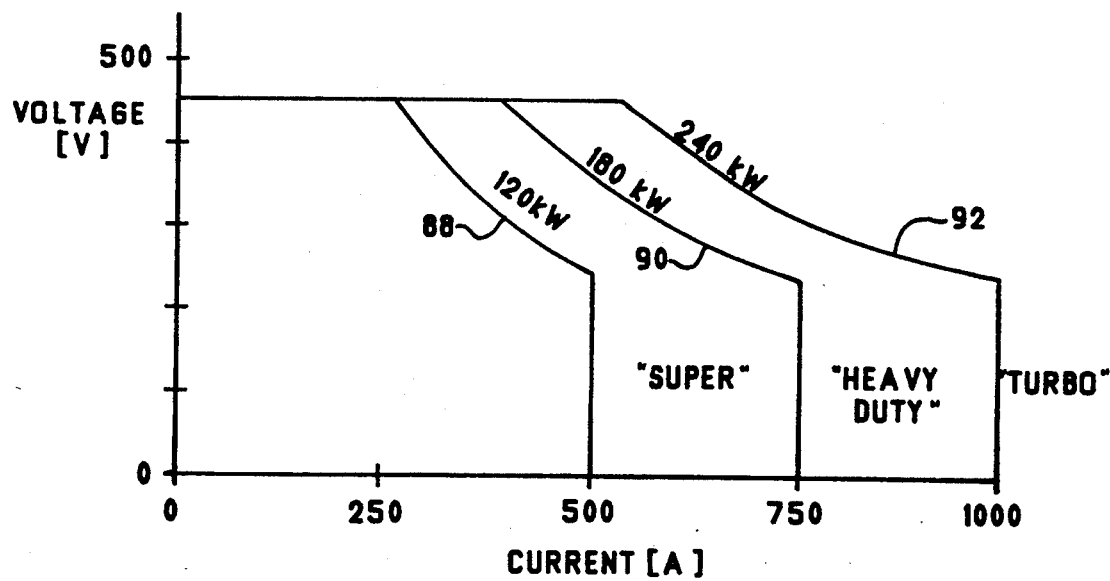
FIG. 8 shows a family of charger characteristic envelopes having different maximum charging currents.

Finally, with reference to FIGS. 7 and 8, a brief discussion of power rating for the charging station of the present invention follows:

FIG. 7 shows two curves 86 and 88, which have the same general form as curve 16 in FIG. 2. However, to carry the analogy of the charging station of the present invention when compared with an ordinary service station selling gasoline or diesel fuel, curve 86 shows the characteristic envelope of a power section for a charging station that would deliver power at a maximum peak rate of 100 kW—the "Regular" rating. Curve 88 shows the "Super" rating at 120 kW. These characteristics are determined from a survey of present electric vehicle designs, which shows that most of the experimental electric vehicles have a nominal voltage of about 216 V or less. Therefore, a compliance or charging voltage of up to 300 V is sufficient, and a peak power of 100 kW is sufficient. Larger and higher energy consuming sports vehicles such as the GM IMPACT may use the Super charging level, with a maximum charging voltage of 450 V (it will be recalled that the nominal term of voltage of the battery, in operation, is 320 V), with 120 kW peak power rating. In the same sense as the analogous service station, a premium price would be paid for the purchase of a charge at the "Super" rating with respect to the "Regular" rating.

Finally, FIG. 8 shows a family of charging station characteristics having a family of characteristic envelopes suitable for sports cars, vans, cargo trucks, and the like. Curve 88 is repeated from FIG. 7, showing a 120 kW peak power envelope; curve 90 is a "Heavy Duty" curve with a 180 kW peak power; and curve 92 which has a maximum charging current of up to 1000 A is typified as "Turbo" and a 240 kW peak power. A comparison of curve 92 of FIG. 8 to curve 10 of FIG. 1 shows a slightly higher peak power capability but with a charging current which is twice as high as that of the characteristic charging envelope of FIG. 1.

The scope of the present invention is defined by the appended claims.

What is claimed is:

1. A charging station for electric vehicles that are equipped with a rechargeable battery, a traction motor and a traction controller for said traction motor, said charging station comprising:

a power section, a power controller section, a power connector for connecting said power section to an electric vehicle for recharging the battery thereof, an interface between said charging station and said electric vehicle, power cables capable of carrying high charging currents from said power section through said power connector to said electric vehicle, signal cable means capable of carrying control signals between said power controller section and said electric vehicle, and lockout means;

wherein said power section is capable of delivering high charging currents at the requisite charging voltage for the battery being charged within predetermined limits of power to be delivered, wherein the rate of delivery of said charging current is controllable;

wherein said power section comprises a power source, rectifying means, and means for controlling the flow of charging current to the rechargeable battery;

wherein said signal cable carries signals from said battery to said power controller that are at least indicative of the voltage of the battery at any instant in time;

wherein said power controller section and said means for controlling the flow of charging current to said rechargeable battery are each fast acting so as to be able to turn delivery of said charging current on and off in less than a few milliseconds;

means for measuring the resistance free voltage of said battery during intervals when delivery of said charging current to said battery has been turned off, whereby operation of said power controller section may be affected by said resistance free voltage, and thereby operation of said means for controlling the flow of charging current to said battery and of said charging station may be controlled as a function of said resistance free voltage of said battery;

wherein at least said power cables and said signal cable means are associated with said interface; and wherein said lockout means is associated with said power connector, and will preclude delivery of charging current to said battery except when said lockout means is locked closed;

whereby operation of said charging station to recharge a battery in an electric vehicle is contingent upon said lockout means being locked closed so as to assure flow of charging current and control signals on their respective cables, and said operation is controlled so that the power being delivered is within said predetermined limits.

2. The charging station of claim 1, further comprising a charge controller which is adapted to control the rate of delivery of charging current to said battery;

wherein said charge controller is specific as to the battery to be charged so that its operating functions are contingent upon the characteristics of said battery to be charged, its nominal voltage and its nominal electrochemical energy capacity, and wherein said charge controller is adapted to pass signals via said signal cable means to said power controller section;

whereby operation of said power controller section is contingent upon the nature of signals received by it from said charge controller, and thereby operation of said charging station is controlled.

3. The charging station of claim 2, wherein said interface and said power connector are physically associated with each other.

4. The charging station of claim 2, wherein said charge controller further includes means to continuously monitor said battery at least as to its internal resistance free voltage and its temperature, so as to pass control signals to said power controller section contingent upon the instantaneous values of said internal resistance free voltage and temperature of said battery.

5. The charging station of claim 3, wherein said charge controller includes means to continuously monitor said battery at least as to its internal resistance free voltage and its temperature, so as to pass control signals to said power controller section contingent upon the instantaneous values of said internal resistance free voltage and temperature of said battery.

6. The charging station of claim 4, wherein said battery comprises a plurality of cells, and wherein the internal resistance free voltage and temperature of said battery are specific to individual cells or groups of cells of said battery.

7. The charging station of claim 5, wherein said battery comprises a plurality of cells, and wherein the internal resistance free voltage and temperature of said battery are specific to individual cells or groups of cells of said battery.

8. The charging station of claim 2, wherein said lockout means is adapted to disable said traction controller for said traction motor when said locked means is locked closed, whereby said traction controller is enabled when said lockout means is open.

9. The charging station of claim 1, further comprising means for determining the temperature of said battery, and alarm means for issuing an alarm signal when the temperature of said battery is above a predetermined level.

10. The charging station of claim 1, including manually operable means for presetting the voltage level and highest current level at which charging current will be delivered to said battery, within said predetermined limits; and further including manually operable means for starting and stopping the charging operation once said voltage level and highest current level have been preset.

11. The charging station of claim 10, further including timer means, and wherein the charging operation is terminated after a predetermined time period.

12. The charging station of claim 11, wherein said timer means is manually operable to preset the time period within predefined limits.

13. The charging station of claim 6, wherein a signal carried by said signal cable is indicative of the level of the charging current to be delivered through said interface and power connector to said battery, and said signal is driven by a clock means;

and wherein when said signal is above a predetermined level, the charging current is on; and when said signal is at or below that predetermined level, the charging current is off; and when said charging current is on, its level is a function of the level of said signal.

14. The charging station of claim 13, wherein said signal is a digital signal.

15. The charging station of claim 13, wherein said signal has a first digital component having two discrete signal levels, and a second variable analog level which is indicative of the level of charging current to be delivered to said battery.

16. The charging station of claim 7, wherein a signal carried by said signal cable is indicative of the level of the charging current to be delivered through said interface and power connector to said battery, and said signal is driven by a clock means;

and wherein when said signal is above a predetermined level, the charging current is on; and when said signal is at or below that predetermined level, the charging current is off; and when said charging current is on, its level is a function of the level of said signal.

17. The charging station of claim 16, wherein said signal is a digital signal.

18. The charging station of claim 17, wherein said signal has a first digital component having two discrete signal levels, and a second variable analog level which is indicative of the level of charging current to be delivered to said battery.

19. The charging station of claim 2, wherein said power connector has a first plug component and a second jack component adapted to mate physically and electrically with each other.

20. The charging station of claim 1, wherein said means for controlling the flow of charging current to said battery is a switching inverter module.

21. The charging station of claim 1, wherein said means for controlling the flow of charging current to said battery is at least one phase controlled silicon controlled rectifier.

22. The charging station of claim 20, wherein said power controller section and said inverter module are each able to turn on and off in less than about 2 milliseconds.

* * * * *